Oct. 6, 1964  H. T. CAMPBELL ETAL  3,151,359
APPARATUS FOR ASSEMBLING AND MOLDING COMPONENTS
Filed Dec. 8, 1961  4 Sheets-Sheet 1

INVENTORS
H.T. CAMPBELL
J.J. MONAHAN
J.A. ROEDER
By M. Johnson
ATTORNEY

Oct. 6, 1964
H. T. CAMPBELL ETAL
3,151,359
APPARATUS FOR ASSEMBLING AND MOLDING COMPONENTS
Filed Dec. 8, 1961
4 Sheets-Sheet 2
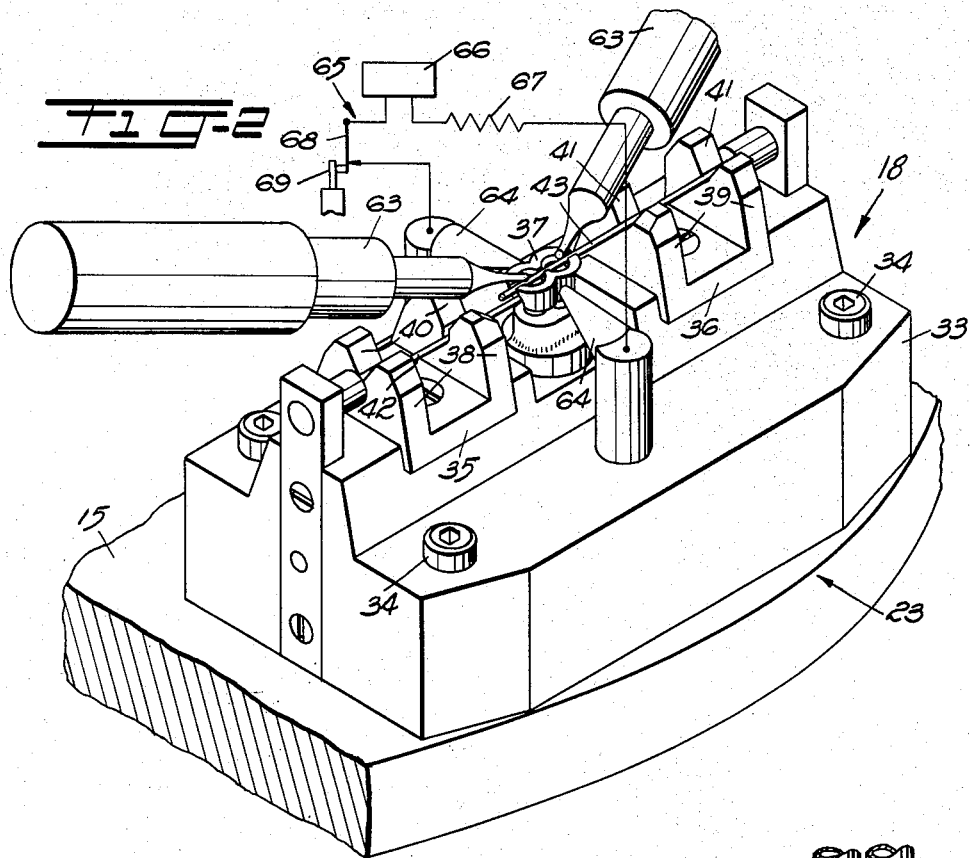
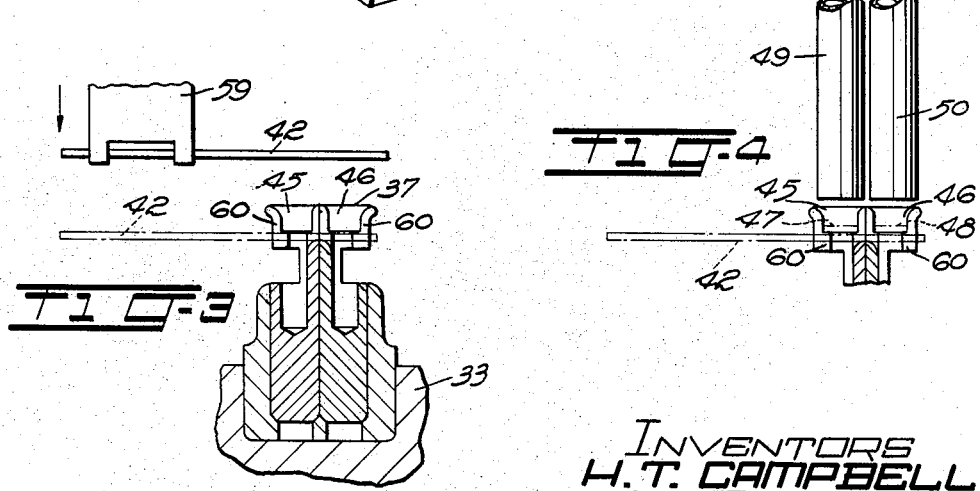
INVENTORS
H. T. CAMPBELL
J. J. MONAHAN
J. A. ROEDER
BY
ATTORNEY

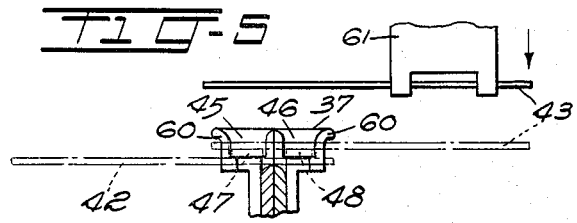
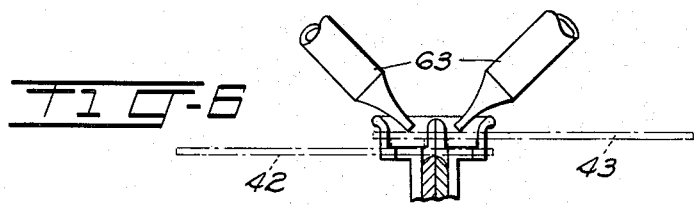
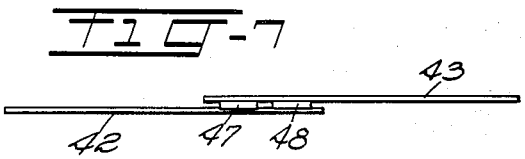
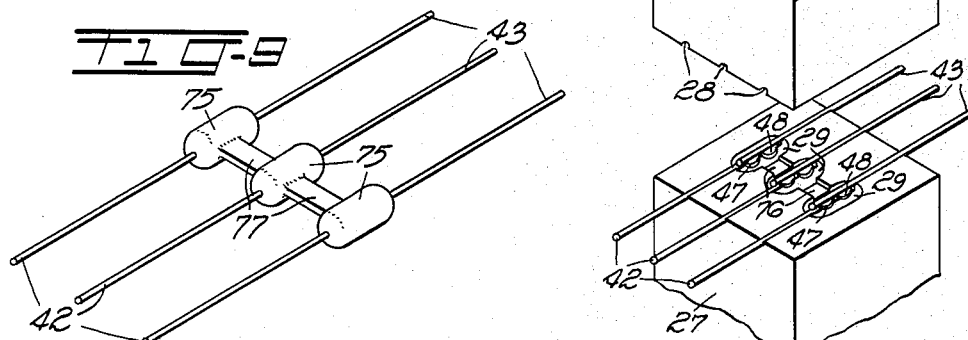
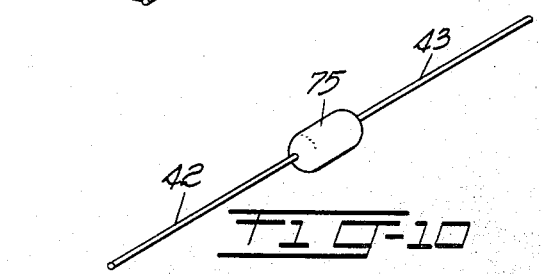

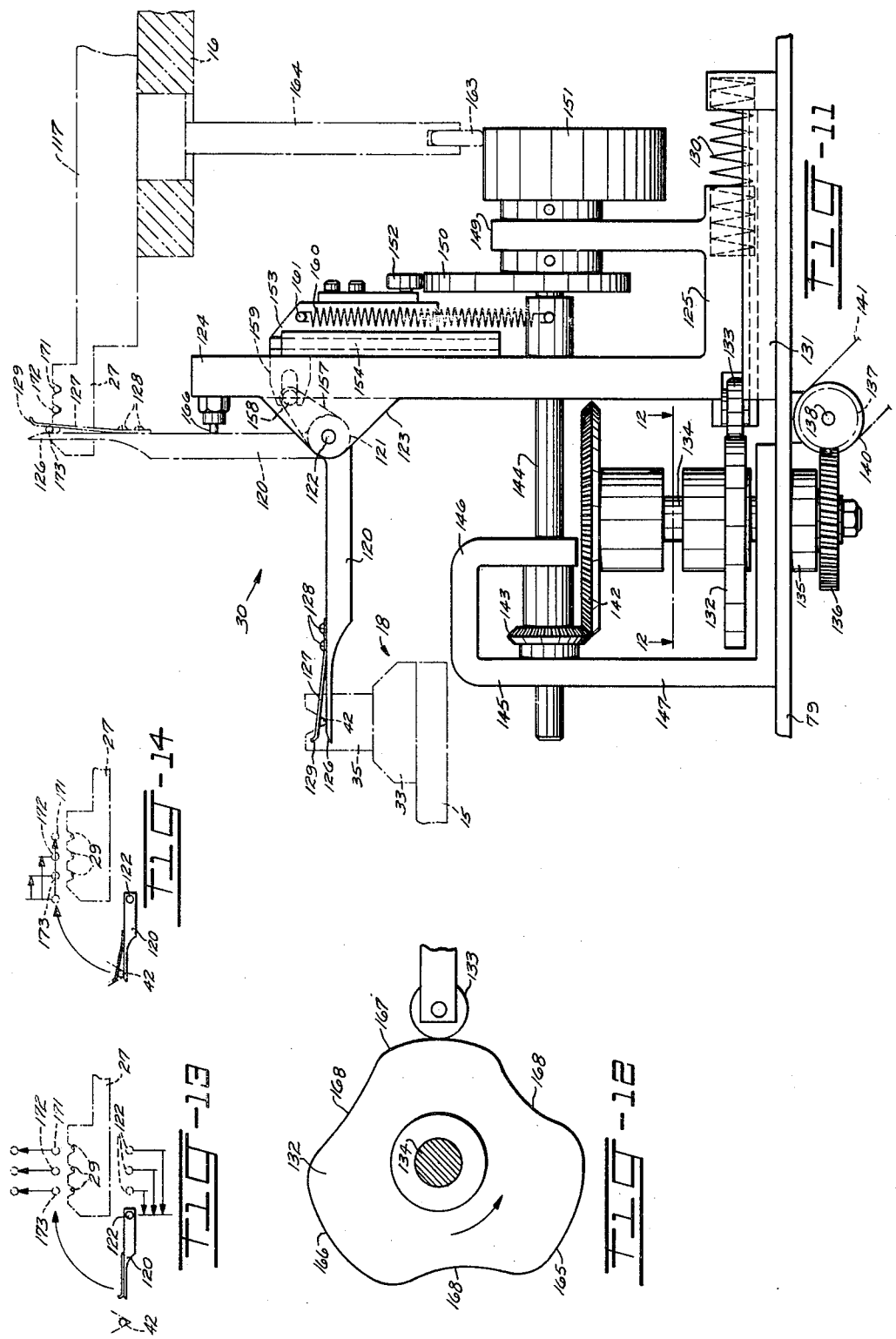

United States Patent Office 3,151,359
Patented Oct. 6, 1964

3,151,359
APPARATUS FOR ASSEMBLING AND MOLDING COMPONENTS
Hobart T. Campbell and Jack J. Monahan, Allentown, and Joseph A. Roeder, Quakertown, Pa., assignors to Western Electric Company, Incorporated, a corporation of New York
Filed Dec. 8, 1961, Ser. No. 157,965
7 Claims. (Cl. 18—20)

This invention relates to apparatus for assembling and molding components, particularly components having leads extending from opposing ends thereof.

In the present instance, varistors composed of pairs of leads, extending in opposite directions and having overlapping inner ends, are to be secured to wafers positioned between the overlapping ends and embedded in a molded compound covering the joining portions of the leads and the wafers.

The object of the invention is an apparatus which is simple in structure and completely automatic in assembling and completing components of this type.

According to the object, the invention includes an apparatus for assembling components wherein first and second turrets are mounted adjacent each other at a transfer station and indexed intermittently at predetermined times between intervals of rest to successively locate radially positioned nests of the first turret and radially positioned molds of the second turret at the transfer station. Units are mounted adjacent the first turret to feed lengths of wire to the nests, while a unit, interposed between the wire feeding means, locates the wafers in the nests relative to the inner overlapping ends of the lengths of wire. The wires and wafers are secured together in assembly so that when reaching the transfer station, the assembly may be transferred to the molds of the second turret where the inner portions, including the overlapping ends of the leads and the wafers, will be embedded in a compound.

Other objects and advantages will be apparent from the following detailed description when considered in conjunction with the accompanying drawings wherein:

FIG. 2 is an enlarged isometric view of one of the nests at the connecting station;

FIG. 3 is a fragmentary detailed view illustrating the location of the first wire in a nest;

FIG. 4 is a fragmentary detailed view illustrating the depositing of wafers on the first wire in a nest;

FIG. 5 is a fragmentary detailed view illustrating the depositing of the second wire in a nest;

FIG. 6 illustrates the connecting of the leads and wafers in the assembly;

FIG. 7 illustrates the completed assembly of the first turret;

FIG. 8 is an isometric view of one of the molds in open position;

FIG. 9 is an isometric view of three components as joined together during the molding operation;

FIG. 10 is an isometric view of a completed component;

FIG. 11 is a side elevational view of a unit to transfer partially completed components from the nests to the molds;

FIG. 12 is a fragmentary sectional view taken along the line 12—12 of FIG. 11, and FIGS. 13 and 14 schematically illustrate the various actions of the transfer arm.

Figure 1:
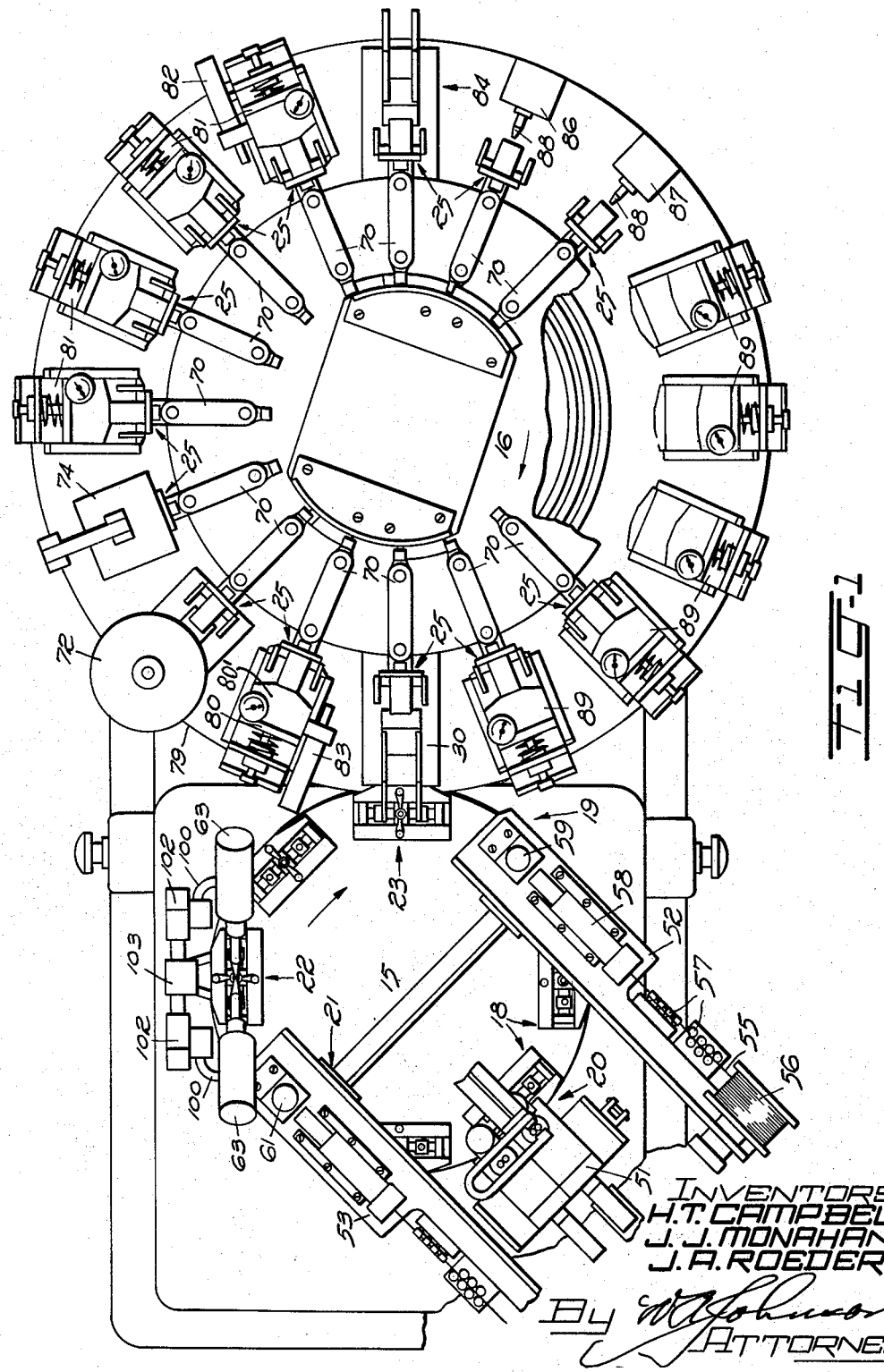
FIG. 1 is a top plan view of the apparatus.

With reference to FIG. 1, the apparatus includes a first turret 15 and a second turret 16, these turrets being mounted on their axes and indexed in the direction of the arrows by any suitable conventional driving means.

The driving means for the turrets are not considered as a part of the invention other than the fact that the first turret 15 is driven after predetermined intervals of rest to successively move nests, indicated generally at 18, relative to a first wire loading station 19, a wafer loading station 20, a second wire loading station 21, a connecting station 22, and a transfer station 23. Furthermore, the second turret 16 has radially positioned molds, indicated generally at 25, with upper and lower members 26 and 27, respectively (FIG. 8), with like cavties 28 and 29, respectively, in their lower and upper surfaces cooperating to receive the assemblies shown in FIG. 7 from the nests of the first turret. Due to the fact that each mold 25 has three cavities or, in other words, a plurality of cavities, each mold entering a transfer station 23 will remain at that station during three indexing movements of the first turret 15 so that three assemblies, as shown in FIG. 7, may, through operation of a transfer unit 30 be transferred to the respective cavities 29 in the lower member 27 of that mold.

The nests 18 are identical and, as shown in FIG. 2, each nest is provided with a base member 33 fixed at 34 to the turret 15. The nest shown in FIG. 2 is provided with a first wire holder 35, a second wire holder 36, and a wafer holder 37. The wire holders 35 and 36 are substantially identical in structure with their U-shaped formations and their vertical legs 38 for the holder 35, and the vertical legs 39 for the holder 36, having recesses 40 and 41, respectively, for receiving the first and second wires. The recesses 40 taper outwardly at their upper ends to guide the first wire 42 into the lower and more restricted portions of the recesses. The same is true regarding the recesses 41 for the second wire 43, the difference being that the lower extremities of the recesses 40 are out of alignment with the lower extremities of the recesses 41 and actually below a plane of the lower portion of the recesses 41 so that the overlapping inner ends of the wires 42 and 43, as illustrated in FIG. 6, will be spaced from each other distances sufficient for the positioning of wafers therebetween.

The wafer holder 37 has spaced pockets 45 and 46 to receive wafers 47 and 48 from dispensing tubes 49 and 50 of a wafer dispensing unit 51 (FIG. 1) as shown in detail in applicants' co-pending application, Serial No. 158,080, filed December 8, 1961. The unit 51 is disposed between wire feeding units 52 and 53 which are shown in detail in applicants' co-pending application, Serial No. 158,052, filed December 8, 1961. These wire feeding units are identical but are mounted at spaced positions so that the unit 52 may advance a wire 55 from a supply 56 through straightening units 57 by a feeding means 58 to a feeder 59 where lengths are cut therefrom. These lengths are identified as the first lead wires 42 and the feeder 59 is shown schematically in FIG. 3.

FIG. 3 illustrates the first wire 42 held by the feeder 59 to be moved into its holder 35, not shown in this figure, so that the right end portion may move through slots 60 in the wafer holder 37 to lie at the bottom of the pockets 45 and 46 where it will support the wafers 47 and 48 dropped thereon from the tubes 49 and 50 when in the wafer dispensing station.

The wire feeding unit 53 is identical in every respect to the wire feeding unit 52 with the possible exception of the length of movement of its feeder 61, shown in FIG. 5, with the second wire 43 shown in solid lines in the holder 61 and in broken lines after it has been lowered into its holder 36, not shown in FIG. 5, with its left end positioned in the slots 60 of the wafer holder 37 and extending through the pockets 45 and 46 to rest upon the wafers 47 and 48.

The wires, from which the lengths 42 and 43 are cut, are coated with solder or other suitable joining material so that when heat is applied to the assembly, shown in FIGS. 2, 5, and 6 through the aid of heated air from nozzles 63, the joining material or solder will be softened sufficiently to flow. To assist in the uniform and efficient joining of the elements of the component, namely, the wires 42 and 43 and the wafers 47 and 48, vibrators 64 are mounted on each nest and positioned sufficiently close to the parts being assembled so that when they are energized, the overlapping portions of the wires will be vibrated to assure uniform flowing of the molten joining material relative to the wires and wafers. The energizing means for the vibrators 64 is represented by a circuit, indicated generally at 65, receiving its electrical energy from a suitable source 66 and including a winding 67 and a normally open switch 68 adapted to be closed by suitable means 69 while each nest is in the connecting station 22.

The mold members 26 and 27 of the mold units 25 are supported individually by suitable means, indicated generally at 70, so that while each mold 25 is in the load station 23, the members 26 and 27 will be open and held open until three assemblies, as shown in FIG. 7, are transferred from three successive nests into the individual cavities 29 in the lower mold member 27. Moving clockwise from the load station 23 to the next station, the mold 25 is closed and locked closed, as illustrated in applicants' co-pending application, Serial No. 157,966, filed December 8, 1961, and now Patent No. 3,117,345. At the next station, a compound dispenser 72 is operated in any suitable manner to deposit molding compound into the successive molds moved into that station, for example, through an injection cavity 73 in each upper mold member 26. At the next station, an injection unit 74 is moved into operation with the mold during the rest interval to cause forcing of the compound into the cavities 28 and 29 to fill the cavities with the compound to cause it to completely surround the joined portions of the assemblies, as illustrated at 75 in FIG. 9. According to conventional molds of this type, passageways 76 between the cavities to permit flowing of the compound to fill the cavities, result in connection portions 77.

An annular element 79, concentric with the second turret 16, is stationary to support the various units associated with the numerous stations. For example, the element 79 supports the transfer unit 30 at the load station.

The lower mold 27 is mounted on, or made a part of, elements 117 supported by the second turret 16 for movement between the normal position for the mold members with their elements 117 resting on the turret 16, and a raised position represented by the upper arrows in FIG. 13. The molds are positioned radially about the turret 16 and, in the present instance, the turret is indexed only once for every three indexing movements of the first turret 15 so that the three cavities in each mold may be filled individually by the transfer unit.

The transfer unit 30 includes a transfer arm 120 which appears to be a single arm but, in reality, it is a double arm or a U-shaped structure having spaced legs or arms 120 adapted to straddle or, be positioned one upon each side of the wafer holder 37 at the wire holders 35 and 36 of each nest 18 in the transfer station, to engage and removably hold the leads of each component assembly. The inner portion of the arm or arms 120, indicated at 121, is pivotally supported at 122 on a portion 123 of a vertical member 124 of a carriage 125. The outer ends of the arms have curved surfaces 126 leading out to their extreme ends or edges to move beneath their respective leads 42 and 43 of the assemblies so that through the assistance of resilient members 127, fixed at 128, and having outwardly turned ends 129, the leads or outer ends of the components may be gripped and removed from the nest 18 during rocking movement of the arms 120 about the pivot 122.

The carriage 125 is supported for movement toward the nest 18 by a spring 130 on a suitable guide 131 and moved away from the nest by a cam 132 engaging a roller 133 supported by the carriage 125. The cam 132 is mounted on a shaft 134 which is journalled in suitable bearings 125 mounted on the support 79. The lower end of the shaft 134 has a helical gear 136 mounted thereon and interengaging a helical gear 137 of a shaft 138 rotatably supported by a bearing unit 139 fixed to the under part of the support 79.

A suitable single drive, represented by a sprocket 140 mounted on the shaft 138, and a chain 141 driven by a power means, not shown, is adapted to cause rotation of the shaft 134 through a partial or ⅓ cycle during every interval of rest of the turret 15 to locate a nest 18 in the transfer station. A large beveled gear 142 is mounted on the upper end of the shaft 134 and interengages a small beveled gear 143 which is keyed to a shaft 144, but held against axial movement between portions 145 and 146 of a bracket 147, the bracket being mounted on the support 79. In the present instance, the ratio of the gears 142 and 143 is 3 to 1 so that during every one-third cycle of the gear 142, the gear 143 and the shaft 144 will be rotated one complete cycle.

The shaft 44 is journalled in suitable bearings 148 and 149 of the carriage 125 and has cams 150 and 151 mounted thereon. The cam 150 engages a roller 152 of an actuator 153 which is in the form of a slide mounted for movement between guides 154, only one of which is shown. The guides 154 are mounted on the vertical portion 124 of the carriage which portion is bifurcated or provide with an opening adapted to receive a projection 157 of the central portion 121 of the arms 120 which carries a pin 158 receivable in a bifurcated portion 159 of the actuator 153. The actuator 153 is provided with one or more springs 160 connected at their ends to pins 161 of the actuator 153 and pins 162 of the bearing 148.

The cam 151 is of sufficient width to move with the carriage 25, yet maintain engagement with a roller or cam follower 163 supported by a rod 164 mounted on each element 117 of each lower mold 27. During each indexing movement of the turret 16, the roller 163 of each element 117 is moved into engagement with the cams 151 and it is the function of the cam 151 to raise the element 117 and its mold member during each cycle of operation of the shaft 144 to cause the molds to receive in their respective cavities, the assemblies or articles and remove them from the arms 120. An adjustable stop 166, supported by the vertical portion 124 of the carriage 125, is positioned to be engaged by one or both of the arms 120 to serve as a locating means for the arms when in upward positions.

The cam 132 has three high portions 165, 166, and 167 with intermediate low portions 168. The low portions 168 are equal distances from the axis of the shaft 134 and determine the movement of the arms when in the horizontal position short of the nest 18 to the gripping position shown in FIG. 11 adjacent the nest 18. The high portions represent the positioning of the arms or particularly the article or component held by the arms when in the upper position with respect to the different cavities 29. The high portion 165 is positioned the greatest distance from the axis of the shaft 134 and is to position the article or component held by the arms 120 in registration with the innermost cavity 29, that cavity located at the right or nearest the center of the turret 16. The next high portion 166 serves to locate the arms with the component in registration with the central cavity and the high portion 167 is to locate the arms with the components in registration with the outermost cavity of the mold in the transfer station.

FIG. 13 illustrates mainly the return actions of the arms 120 to the horizontal locations and the distance of movement in each instance, resulting from the varied distances of movement of the carriage traveling from the respective high portions of the cam 153 to their low portions 168, so that, in each instance, the component or article in the nest will be engaged.

FIG. 14 illustrates mainly the movement of the arms 120 from the horizontal position to the vertical position where the component will be located at 170, after which the respective high portions will be illustrated in their order at 171, 172, and 173.

The element 79 also supports the locking means and a preheating means 80 at the next station. The preheating means interposed between the transfer station 30 and the dispensing unit 72, includes an electrically heated member 80' supported on the stationary element 79 and moved into engagement with the successive molds 25 while at rest on that station to heat them to predetermined temperatures prior to receiving the molding compound at the next station. The element 79 also supports the compound dispenser 72 and the injection unit 74. Heating units 81 similar to the preheating unit 80' are mounted on the element 79 at the next four stations electrically heated and movable to engage the molds 25. The last of this group of heating units has an unlocking means 82 similar to the locking means indicated at 83 of the preheating unit 80' and shown in the aforementioned co-pending application. In this manner, just before the molds reach an unloading station, indicated generally at 84, the molding has been completed and the successive molds are unlocked so that they may be opened when entering the unload station 84. At the unload station, the finished components are removed singly from each mold by an unloading unit, shown in detail in applicants' co-pending application, Serial No. 158,048 filed December 8, 1961. The unloading unit is adapted to grip the leads of the successive components, for example, as shown in FIG. 9, break the connection 77 with its adjacent component, and remove the component from the mold. Therefore, when each mold is in the unload station 84, three successive unloading operations are performed for each mold to remove the components individually.

Units 86 and 87 are mounted at the next two stations to force air or any other suitable fluid through nozzles 88 into the open molds to clear particles from the cavities thereof. At the next five stations, electrically heated units 89 similar to the preheating unit 80' are mounted on the element 79 and movable into engagement with the molds during intervals of rest of the turret 16 to pre-heat the molds prior to reaching the loading station 23.

*Operation*

Once the apparatus is started in operation, assuming that this operation has continued to a point where the molds of the second turret have been loaded with assemblies from the load station 23 to the unload station 84, the sequence may be followed during the three indexing movements of the first turret 15 for each indexing movement of the second turret 16. When each nest leaves the load station and arrives at station 19, the first wire 42, through operation of the unit 52, will be lowered by the feeder 59 into its holder 35 causing its right end to lie at the bottom of the pockets 45 and 46 in the wafer holder 37.

After two indexing movements of the first turret 15, this nest reaches station 20 where the wafer dispenser 51 causes wafers 47 and 48 (FIG. 4) to drop into their respective pockets and lie on the adjacent end of the first wire 42. After two more indexing movements, this nest reaches station 21 where the feeder 61 of unit 53 will lower the second wire 43 into its holder 36 so that the left end of the second wire will lie on the wafers 47 and 48, as shown in FIG. 5. After the next indexing movement of the first turret 15, this nest with its parts, namely, the first wire 42, the pair of wafers 47 and 48, and the second wire 43, will be connected through energization of the elements 63. In reality, the elements 63 are nozzles connected through lines 100 (FIG. 1) to units 102 supplied with heated air from a unit 103, to heat the connecting material or solder on the wires sufficiently to cause it to flow.

At this station, a member 69 closes the circuit 65 (FIG. 2) to energize the vibrators 64, resulting in vibration of the wires at their overlapping ends to cause flowing of the connecting material or solder to firmly join the overlapping ends of the wires and the wafers to complete the assembly, as shown in FIG. 7. When reaching the load station 23, the assemblies are removed from the nest and deposited in their respective order in the cavities 29 of the lower mold member at that station. The loading is carried out in such a manner that the loading means will carry the assemblies first to the innermost cavity, then to the central cavity, and finally to the outermost cavity. These actions continue for each nest so that after each indexing movement of the first turret 15 to the load station, an assembly is in position to be loaded into the mold 25 at that station.

Although the action of the second turret 16 is slower than that of the first turret, the intervals of rest are employed, for example, when the molds are positioned to be engaged by the pre-heaters 89 and also the pre-heater 80 to have the molds at those stations heated sufficiently so that when the molds are finally loaded at the load station 23 and moved into the compound feeding station adjacent the unit 72, the molding operation may be completed with the unit 73 and the assistance of the bake-out stations through the assistance of the heating units 81.

During the interval immediately following the load station, and immediately prior to the unload stations 23 and 84, respectively, the molds are locked closed to assure uniform molding of the compound about the connected portions of the assembly. When reaching the unload station 84, the molds are opened and the finished components are removed individually. After leaving the unload station, the molds are cleaned through the aid of the units 86 and 87 and ready to be moved to their preconditioning stations toward the load station 23.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:
1. An apparatus for making electrical components comprising:
   a transfer station,
   a first turret mounted adjacent to one side of the transfer station and indexed intermittently at predetermined times between intervals of rest,
   nests mounted radially at spaced positions on the first turret so that they will be located successively at the transfer station,
   a wafer holder mounted in each nest,
   spaced wire holders mounted in each nest,
   wire feeding units mounted with respect to the first turret to feed first and second lead wires of predetermined lengths at different intervals of rest to the respective wire holders of each nest with their adjacent ends overlapping,
   a wafer feeding unit interposed between the wire feeding units and adjacent to the first turret to deposit wafers on the first lead wires in the nest and thereby interpose said wafers between overlapping ends of the lead wires in the nests,
   a connecting station mounted adjacent to the first turret in advance of the transfer station,
   means mounted at the connection station to secure the overlapping ends of the leads to the wafers, a second turret mounted adjacent to another side of the transfer station and indexed intermittently at predetermined times between intervals of rest, molds with cavities therein radially positioned on the second turret, a support mounted adjacent the second turret, a transfer unit mounted on the support at the transfer station and having movable arms adapted to engage the leads of each component, and means to move the arms to cause them to engage the leads of each component in the nest at the transfer station, remove each component from the nest and place it into an adjacent mold.

2. An apparatus for making electrical components according to claim 1 in which:

a carriage supports the first turret, and means to support the carriage for movement relative to the second turret to vary the relative positions of the nests of the first turret and the molds of the second turret when in the transfer station.

3. An apparatus for making electrical components according to claim 1 in which:

the molds of the second turret each having a plurality of spaced cavities, and means of the transfer unit operable to transfer the components from predetermined successive nests into the spaced cavities of each mold in a given order.

4. An apparatus for making components according to claim 1 in which:

a heating unit is mounted on the support and includes an electrically heated member movable to engage and preheat each mold in advance of the transfer station during each interval of rest of the second turret.

5. An apparatus for making components according to claim 1 in which:

a heating unit is mounted on the support and includes an electrically heated member movable to engage and preheat each mold in advance of the transfer station during each interval of rest of the second turret, and a dispensing unit mounted on the support at a fixed position adjacent the second turret and operable to inject a molding compound into each mold when located adjacent the dispensing unit.

6. An apparatus for making components according to claim 1 in which:

a heating unit is mounted on the support and includes an electrically heated member movable to engage and preheat each mold in advance of the transfer station during each interval of rest of the second turret, a dispensing unit mounted on the support at a fixed position adjacent the second turret and operable to inject a molding compound into each mold when located adjacent the dispensing unit, and a heating unit mounted in the support in advance of the dispensing unit and including an electrically heated member movable to engage and preheat each mold during each interval of rest prior to receiving the molding compound.

7. An apparatus for making components according to claim 1 in which:

a heating unit is mounted on the support and includes an electrically heated member movable to engage and preheat each mold in advance of the transfer station during each interval of rest of the second turret, a dispensing unit mounted on the support at a fixed position adjacent the second turret and operable to inject a molding compound into each mold when located adjacent the dispensing unit, a heating unit mounted in the support in advance of the dispensing unit and including an electrically heated member movable to engage and preheat each mold during each interval of rest prior to receiving the molding compound, and heating units mounted at a plurality of the stations following the dispensing unit and including electrically heated members movable to engage and continue heating of the molds during intervals of rest of the second turret.

References Cited in the file of this patent

UNITED STATES PATENTS

| | | |
|---|---|---|
| 379,068 | Heller et al. | Mar. 6, 1888 |
| 2,176,604 | Benkelman | Oct. 17, 1939 |
| 2,881,475 | Wilckens | Apr. 14, 1959 |
| 2,954,585 | Simpson | Oct. 4, 1960 |
| 2,997,414 | Netherwood et al. | Aug. 22, 1961 |
| 3,008,211 | Boyd | Nov. 14, 1961 |